A. A. LIVINGSTON.
Carriage-Springs.

No. 133,651. Patented Dec. 3, 1872.

Witnesses

Inventor,
Augustus A. Livingston
By his Atty

UNITED STATES PATENT OFFICE.

AUGUSTUS A. LIVINGSTON, OF WILMINGTON, ILLINOIS.

IMPROVEMENT IN CARRIAGE-SPRINGS.

Specification forming part of Letters Patent No. 133,651, dated December 3, 1872.

*To all whom it may concern:*

Be it known that I, AUGUSTUS A. LIVINGSTON, of Wilmington, in the county of Will and State of Illinois, have invented a new and useful Improvement in Springs for Wagons, of which the following is a specification:

The present invention relates to providing springs for lumber-wagons and other vehicles in which the boxes are usually placed on the bolsters; and its nature consists in the novel construction of removable bearing-plates, fitted to the bolsters and combined with coil-spring and rubber buffer-springs, by means of which a light or heavy load can be transported to a better advantage, while at the same time the springs can be readily removed when the wagon is to be used for heavy work, such as hauling stone, hay, grain, &c.

Figure 1:
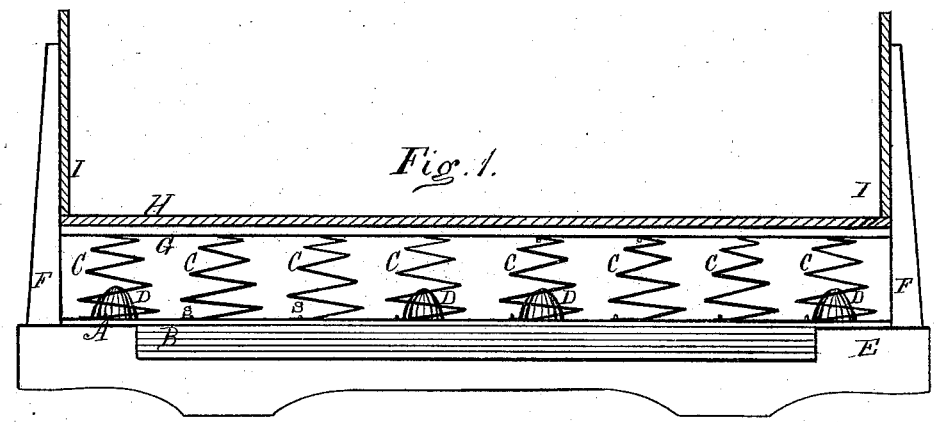
Figure 2:
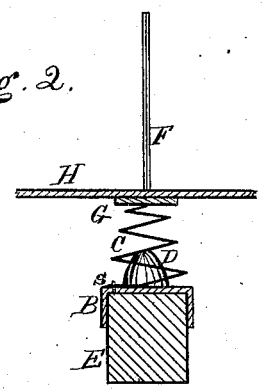
Figure 4:
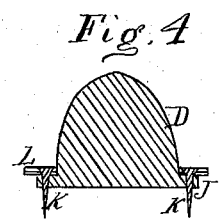
Figure 3:
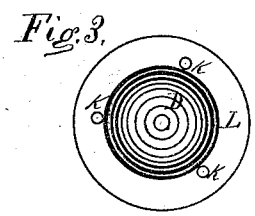

In the drawing, Figure 1 is a longitudinal elevation of a wagon-bolster provided with my improved spring device; Fig. 2, a transverse section thereof; Fig. 3, a plan of one of the rubber buffer-springs; and Fig. 4, a section of the buffer-spring—the last two figures being enlarged to show how the rubbers are fastened to the bearing-plate.

A B represent a bearing-plate, which in this case is made of suitable sheet metal (but it may be of wood) and formed so that the part A lies flat on the top of the bolster E, and the flanges B project down onto the sides of the bolster, as clearly shown. Any number of coil-springs C, generally eight, are secured by staples S, or other suitable fastenings, to the bearing-plate A B, and also fastened at their top ends to a bearer, C, which is of wood, and on which the box H bears. The springs C in this case have a spiral conical form four inches across their bases, two inches across their top ends, and four inches high. Cylindrical coil-springs, however, may be substituted for those shown. To provide for transporting a greater load than the coil-springs will conveniently support, rubber buffer-springs D are placed inside of the springs C, and held in place by means of flange-collars L placed over the flanges J, Fig. 4, and held in place to the bearing-plates A B by rivets K.

By means of this combination and arrangement a very simple, cheap, and durable spring is provided for supporting loads weighing from one thousand to one thousand and five hundred pounds, and when a hay-rack or other form of box is to be used, the spring attachment can be readily lifted off, leaving the wagon to be used in any manner desired.

Having thus described my invention, what I claim, and desire to secure by Letters Patent of the United States, is—

The removable bearing-plates A B, springs C, bearer G, and buffer-springs placed inside of springs C, substantially as and for the purpose set forth.

AUGUSTUS A. LIVINGSTON.

Witnesses:
    JAMES L. YOUNG,
    JOHN R. JONES.